United States Patent [19]

Kovacik et al.

[11] Patent Number: 5,021,074
[45] Date of Patent: Jun. 4, 1991

[54] METHOD OF AND APPARATUS FOR JOINING EDGES OF GLASS SHEETS, ONE OF WHICH HAS AN ELECTROCONDUCTIVE COATING AND THE ARTICLE MADE THEREBY

[75] Inventors: Paul J. Kovacik, Ford City; Charles R. Davidson, Natrona Heights, both of Pa.; Kevin B. Lindsay; Darrel V. Lundberg, both of Marshall, Minn.; Cameron A. Mulder, Minneota, Minn.; Everett Boerboom, Amiret, Minn.

[73] Assignee: PPG Industries, Inc., Pittsburgh, Pa.

[21] Appl. No.: 468,039

[22] Filed: Jan. 22, 1990

Related U.S. Application Data

[62] Division of Ser. No. 146,873, Jan. 22, 1988, abandoned.

[51] Int. Cl.$^5$ .................. C03B 23/203; C03B 23/24
[52] U.S. Cl. .................................. 65/40; 65/43; 65/54; 65/58; 156/109
[58] Field of Search .................. 65/40, 43, 54, 58; 204/192.1; 428/34; 156/109

[56] References Cited

U.S. PATENT DOCUMENTS

| | | | |
|---|---|---|---|
| 4,132,539 | 1/1979 | Jeffries | 65/40 |
| 4,350,515 | 9/1982 | Stewart | 65/40 |
| 4,610,771 | 9/1986 | Gillery | 204/192.1 |
| 4,683,154 | 7/1987 | Benson et al. | 428/34 |
| 4,786,344 | 11/1988 | Beuther | 156/109 |
| 4,941,302 | 7/1990 | Barry | 52/171 |

*Primary Examiner*—Robert L. Lindsay
*Attorney, Agent, or Firm*—Donald C. Lepiane

[57] ABSTRACT

An insulated glass unit formed from a pair of glass sheets, one of which has an electroconductive coating, i.e. a first sheet, is fabricated by positioning the first sheet on a vacuum support and the other sheet, i.e. second sheet, spaced above the first sheet a sufficient distance therefrom to prevent arcing during electrical heating of the marginal edges of the second sheet. After the marginal edges of the second sheet are heated to a temperature sufficient to cause sagging of the marginal edges, the two sheets are brought together to join the marginal edges by fusion. A strip heater heats the edges of the sheet to a temperature sufficient to prevent chilling of the marginal edges of the upper sheet when contacting the marginal edges of the lower sheet. Thereafter, the sheets are separated from one another and air moved between the sheets to bloom the edes. After blooming the edges, the joined glass sheets are annealed, and an insulating gas moved into the airspace through a pore hole. Thereafter the pore hole is sealed.

16 Claims, 2 Drawing Sheets

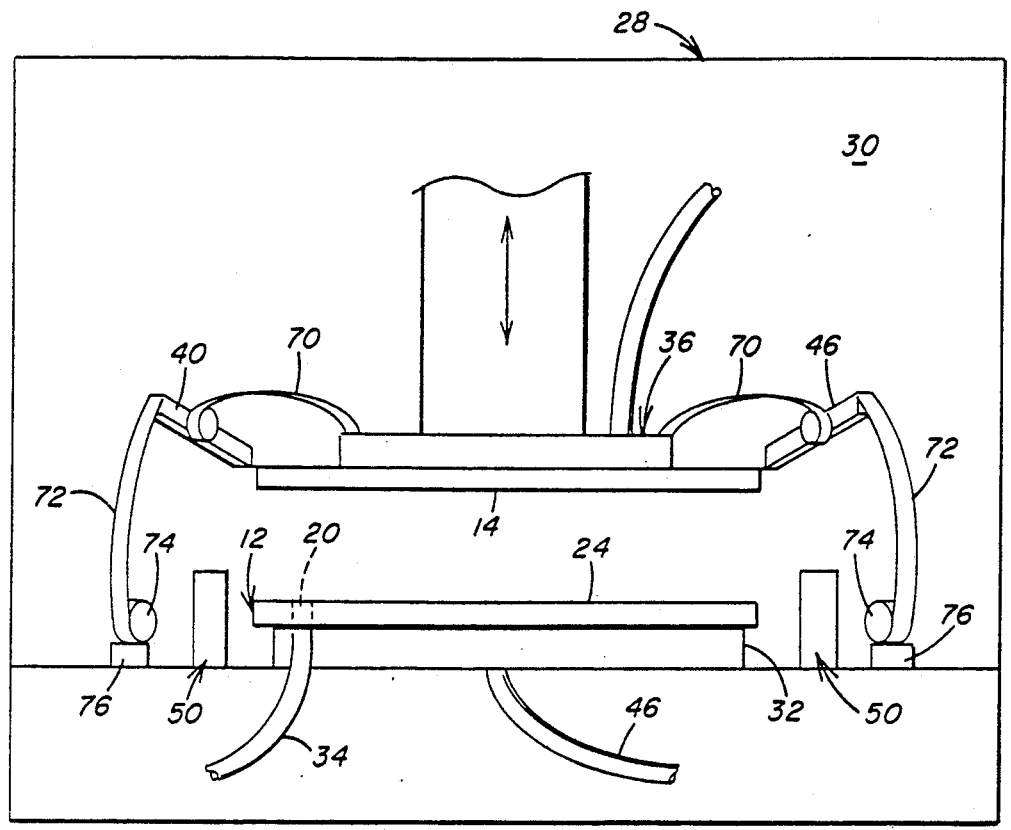
FIG. 3
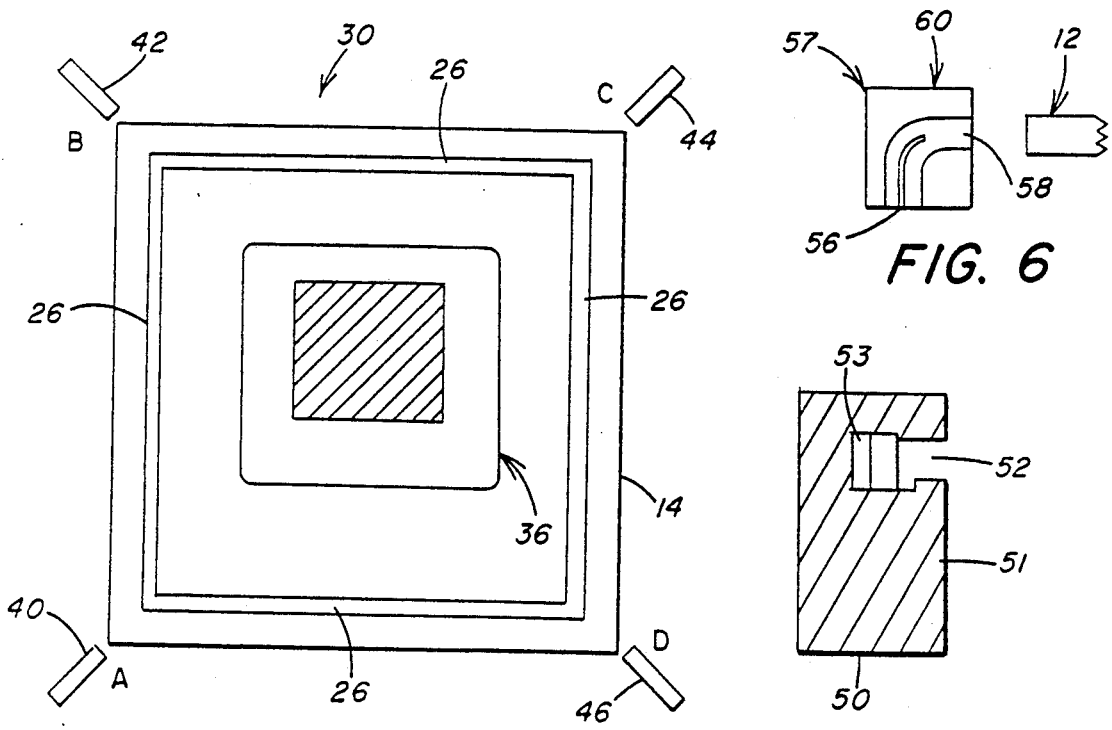
FIG. 4
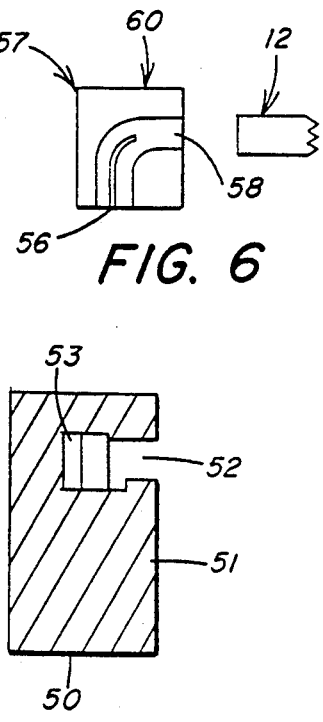
FIG. 6
FIG. 5

METHOD OF AND APPARATUS FOR JOINING EDGES OF GLASS SHEETS, ONE OF WHICH HAS AN ELECTROCONDUCTIVE COATING AND THE ARTICLE MADE THEREBY

This is a division of application Ser. No. 146,873, filed Jan. 22, 1988, now abandoned.

BACKGROUND OF THE INVENTION

1. Field of the Invention

This invention relates to a glass edge insulating unit and a method of and apparatus for making same by welding edges of glass sheets and, more particularly, joining by fusion edges of a pair of glass sheets, at least one of which has an electroconductive coating.

2. Discussion of the Prior Art and Technical Limitations of Present Technology Insulated glass units include a pair of glass sheets spaced from one another to provide an airspace therebetween. The edges of the glass sheets are sealed using a moisture-resistant adhesive, or by welding the edges of glass sheets together. To enhance the insulating value of the units, in many instances, one of the glass sheets has a coating applied to one of the surfaces to reflect energy in selected wavelengths, for example, reflective coatings of the type taught in U.S. Pat. Nos. 4,610,771; 4,113,599 and 4,512,864. A characteristic of such coatings is that they are electroconductive. Insulated glazed units having an electroconductive coating on a sheet are easily made using processes that include the use of an adhesive to seal the space between the glass sheets, e.g. as taught in U.S. Pat. No. 4,622,249. However, such units are not easily made using processes that include moving electrical current along the sheets during fusing of the edges of the glass sheets together.

More particularly, in the process of manufacturing glass edge insulating units, for example, as taught in U.S. Pat. No. 4,132,539, which teachings are hereby incorporated by reference, a pair of glass sheets are washed and dried. In general, an electrically conductive stripe is deposited on the upper surface of the upper sheet to form a continuous electrical path around the marginal edge portions of the sheet. The sheets are assembled one on top of the other, preheated and moved into a welding chamber. A plurality of electrodes, preferably placed at the corners of a rectangular glass sheet, direct the flow of electric heating currents through selected portions of the stripe. The Portions of the upper sheet underlying the continuous stripe are heated by the current flowing through the stripe until the glass obtains a temperature at which the stripe burns off, and the glass becomes electrically conductive. The heating currents now flow through the heated marginal edges of the upper sheet.

The corresponding marginal edges of the lower sheet are heated by their close association with the heated marginal edges of the upper sheet to temperature at which the marginal edge of the lower sheet becomes electrically conductive. Heating by passing electrical currents through the heated marginal edges of the sheets is continued until the marginal edges of both sheets are softened and run together to form a continuous peripheral weld uniting the assembled sheets. Thereafter, the sheets are pulled apart while air is moved in a known manner through a hole in one of the sheets, i.e., a pore hole, into the airspace between the sheets to bloom the edges of the unit.

The unit is annealed, an insulating gas is moved into the airspace through the pore hole, and the pore hole is sealed.

The process described above for joining marginal edges of glass sheets is acceptable provided neither of the glass sheets has an electroconductive coating. In the instance where one or both of the sheets has an electroconductive coating, the current moves through the stripe, through the electroconductive coating to heat the body of the sheet. The heat is not concentrated at the marginal edges of the glass sheets; the entire sheet is heated and at high temperatures fuses to the sheets together. Further, the electroconductive coating may be damaged due to carrying the high currents needed to soften glass.

It would be advantageous therefore, to provide a process of and apparatus for welding the edges of glass sheets together when at least one of the sheets has an electroconductive coating.

U.S. Pat. No. 4,350,515 teaches a technique for making a glass edge insulating unit having an airspace of ½ inch (1.27 centimeter) or greater. In general, the marginal edges of a pair of glass sheets, are heated as previously discussed. After the edges are joined to form a continuous weld and electric heating discontinued, the sheets are pulled apart and held in a fixed spacial position for a period of time. Thereafter the sheets are drawn further apart until the unit has an airspace of about ½ inch (1.27 centimeter). The delay in the draw is practiced to obtain sidewalls of substantially uniform thickness.

As can be appreciated, it would be advantageous to provide another technique, not taught by the practice of the presently available processes, for making a glass edge insulating unit having an airspace of about ½ inch (1.27 centimeter) or greater and sidewalls of substantially uniform thickness.

SUMMARY OF THE INVENTION

One embodiment of the invention covers a process for manufacturing a glass edge insulating unit. In general, a first glass sheet is positioned on a support with a second glass sheet spaced above the first sheet. The marginal edges of the first or upper sheet are heated in any conventional manner to a temperature at which they will fuse. During the heating of the upper sheet, heat is applied in any convenient manner to the marginal edges of the lower sheet. The marginal edges of the upper and lower sheets are brought into contact with one another. Thereafter, the upper glass sheet is raised and gas e.g. air, is moved through the unit to bloom the edges. The unit is moved through an annealing lehr. Thereafter, an insulating gas is moved into the unit through a pore hole previously provided in one of the sheets and the pore hole is sealed.

Another embodiment of the invention covers a process for manufacturing a glass edge unit having an electroconductive coating on a surface of one of the glass sheets. In general, a first or bottom glass sheet having the electroconductive coating is positioned on a support, and the second or upper uncoated sheet spaced above the first sheet a sufficient distance such that electrical energy applied to heat the second sheet does not arc to the electroconductive coating of the first sheet. Current is applied to an electroconductive stripe on the second sheet to vaporize the stripe and heat the glass to a temperature sufficient for the glass to conduct electrical current. As the marginal edges of the upper sheet are heated, the marginal edges of the lower sheet are heated to a temperature sufficient to prevent them from acting as a heat sink to cool the marginal edges of the upper sheet when the edges are brought into contact with one another. After the marginal edges of the upper glass sheet are heated, the electric heating is discontinued, heat is still applied to the marginal edges of the lower sheet, and the two sheets are brought together to allow the glass at the marginal edges of the sheets to fuse together. Preferably the marginal edges of the lower sheet are heated by radiant or convection heat, for example, by a resistance type heating element or gas burner to maintain the fused edges at a temperature sufficient to insure an acceptable Peripheral weld. Thereafter, the glass sheets are pulled apart, and air is moved through the pore hole to bloom the edges. As before, the unit is annealed, and the airspace is filled with an insulating gas.

Other embodiments of the invention include units made by either of the above processes and equipment for practicing the processes.

BRIEF DESCRIPTION OF THE DRAWING

FIG. 3 is a front elevated view of a welding position for fusing edges of glass sheets together according to the teachings of the instant invention.

FIG. 4 is a plan view of the welding position shown in FIG. 3 having portions removed for purposes of clarity.

FIG. 5 is a cross-sectional side view of a side heater incorporating features of the invention used in accordance with the teachings of the instant invention.

FIG. 6 is a cross-sectional side view of another type of heater having portions removed for clarity used in the practice of the invention.

DESCRIPTION OF THE INVENTION

Figure 1:
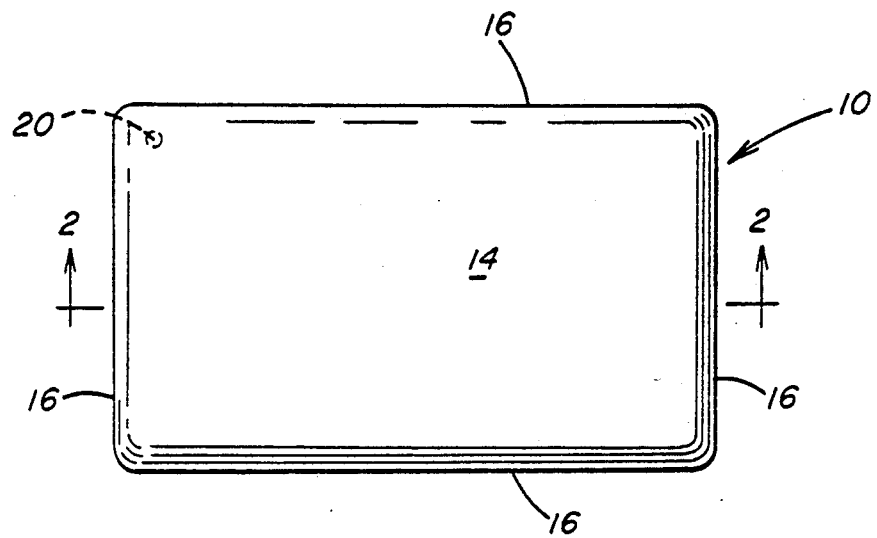
FIG. 1 is a plan view of a glass-edge insulating unit fabricated according to the teachings of the instant invention.
Figure 2:
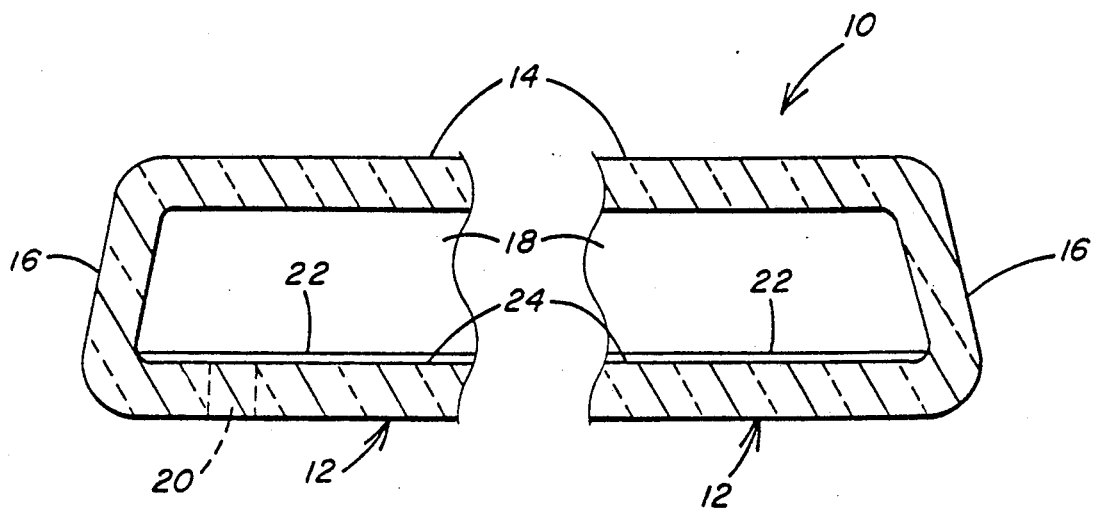
FIG. 2 is a sectional view of the unit in FIG. 1 taken along lines 2—2.

With reference to FIGS. 1 and 2, as required, there is shown a glass edge insulating unit 10, incorporating features of the invention, having a pair of glass sheets 12 and 14, referred to herein, for convenience, as lower or first sheet 12 and upper or second sheet 14. As shown in FIG. 2, the lower sheet 12 and upper sheet 14 have portions of their marginal edge fused together at the periphery of the unit 10 by a perimeter wall hereinafter referred to as a sidewall 16, to form an airspace 18 therebetween. Although not limited to the invention, as shown in FIG. 2, the shape of the sidewall 16 moving from the first sheet 12 toward the second sheet 14 is sloped inboard toward the airspace 18. The sloping of the sidewall 16 relative to the airspace 18 and first sheet 12 is characteristic of embodiments of the invention of heat softening the marginal edges of the upper sheet 14 prior to fusing the marginal edges of the sheets together in a manner to be discussed below. A pore hole 20 is provided in one of the glass sheets, e.g. lower sheet 12 as shown in FIG. 2 to move an insulating gas into the airspace 18. In the following discussion of the invention, one of the glass sheets e.g. lower sheet 12 as shown in FIG. 2 has an environmental electroconductive coating 22 on the surface 24 of the sheet 12.

The invention is not limited to the coating 22 or technique for applying the coating. However, the invention is practiced in a heated environment; therefore, the coating 22 is preferably of the type that is not adversely affected by high temperature, e.g. the coating does not deteriorate. Units 10 of the instant invention have been made using a lower sheet 12 having a coating 22 on the surface 24 of the type sold by PPG Industries, Inc. under its Sungate ® 400 trademark and taught in U.S. Pat. application Ser. No. 947,799, filed on Dec. 29, 1986, in the name of J. J. Finley, which teachings are hereby incorporated by reference. The Sungate ® 400 coating has an emissivity of less than 0.4, is electrically conductive and is not adversely affected by temperatures up to about 1300° F. (704° C.) for several minutes.

Other coatings that may be used in the practice of the invention are taught in U.S. Pat. Nos. 3,107,177 and 4,201,649, which teachings are hereby incorporated by reference.

The following procedure describes the invention as it was practiced to make a glass insulating unit having a width of about 20 inches (0.508 meter), a length of about 44 inches (1.12 meters), an airspace thickness of about 0.440 inch (1.10 centimeters), and a Sungate ® 400 coated glass sheet.

The upper glass sheet 14 had a width of about 20 and 29/32nd inches (0.531 meter), a length of about 44 and 3/8th inches (1.13 meters) and a thickness of about 0.094 inch (2.4 millimeters). The lower glass sheet 12 had an electroconductive coating 22 on its surface 24 of the type sold by PPG Industries, Inc. under its Sungate ® 400 trademark. The lower sheet 12 had a width of about 20 and 19/32nd inches (0.518 meter), a length of about 44 and 1/16th inch (1.03 meters) and a thickness of about 0.091 inch (2.3 millimeters).

As will be appreciated, the size of the glass sheets is not limiting to the invention. The width and length of the glass sheets is limited only by the size of the completed unit that can be accommodated at the welding station. The thickness of the glass sheets is not limiting to the invention; however, the thickness of the glass sheet should be considered. More particularly, the thicker the glass sheet, the easier it is to handle. For example, as the thickness of the upper sheet 14 increases, the tendency of the sheet to bow decreases during the welding procedure to be discussed in detail below. Glass sheets that are too thick have less deflection and may have limited uses at high altitudes. It is recommended, but not limiting to the invention, to use glass sheets in the thickness range of about 0.083 to 0.1220 inches (2.1 to 3.1 millimeters).

It is recommended that the upper sheet 14 has peripheral dimensions greater than the corresponding dimensions of the lower sheet 12 to compensate for the heated marginal edges of the upper sheet 14 that sag downwardly to form the sidewall 16.

Prior to moving the sheets into the welding station, the sheets 12 and 14 were prepared as follows. The electroconductive coating 22 was removed from the marginal edges of the surface 24 of the lower sheet 12. Although not limiting to the invention, it has been determined that removing the coating from the marginal edges of the lower sheet provides a more consistent fusion of the marginal edges of the upper and lower sheet 14 and 12. A pore hole 20 was drilled in the lower sheet. The pore hole was sufficiently close to the edge of the lower sheet 12 so that it is less noticeable to the naked eye when the unit was mounted in a sash (not shown). The corners of the upper sheet 14 were nipped to remove a triangular glass piece about ½ inch (1.27 centimeter) in length as measured from the corner. Although not limiting to the invention, the triangular piece of glass was removed to prevent accumulation of glass at the corners of the unit.

The glass sheets were washed and dried and an electroconductive volatilizable stripe 26 (see FIG. 4) was deposited on the marginal edges of the upper sheet 14. The material used for the stripe was purchased from the Colloidal Graphite Company. The stripe was applied in the expected area of glass bend, i.e. a stripe about ¼ inch (0.635 centimeter) wide was deposited inboard of the edge leaving about ¼ inch (0.635 centimeter) margin of clear glass. The sheets were moved into a preheat position (not shown) of a welding station 28 to preheat the sheets to a temperature of about 850° F. (454° C.); thereafter, the sheets were moved into the welding position 30 of the welding station 28 shown in FIG. 3. In the welding position 30 the lower sheet 12 was positioned on a sheet supporting platen 32 with the coated surface 24 of the sheet 12 facing upwardly as viewed in FIG. 3. The pore hole 20 was aligned with end of airline 34. The upper sheet 14 was held to moveable platen 36 by vacuum, a spaced distance from the lower sheet 12 of about 2.5-3 inches (6.35-7.62 centimeter).

As can be appreciated, the invention is not limited to the spaced distance between the sheets 12 and 14; however, the sheets should be spaced a sufficient distance to prevent arcing. As will be appreciated, the system for applying current to the stripe 26 on the upper sheet 12 to heat the marginal edges of the upper sheet is not limiting to the invention. For example, heating current may be applied in accordance to the teachings of U.S. Pat. Nos. 2,389,360; 2,394,051; 3,510,285; 3,628,935; 3,726,658; 3,847,584; 4,132,539 or 4,350,515 which teachings are hereby incorporated by reference.

With reference to FIG. 4, electrodes 40 and 42 at corners A and B, respectively, of the upper sheet 14 were energized to move a current through the conductive stripe portion 26 between corners AB. The electrode 40 was thereafter de-energized, and electrode 44 energized to move a current through the conductive stripe portion 26 between corners BC; thereafter, the electrode 42 was de-energized, and electrode 46 energized to move an electric current through the conductive stripe portion 26 between the corners CD, and, thereafter, the electrode 44 was de-energized, and electrode 40 energized to heat the conductive stripe portion 26 between corners DA. One side heating cycle for purposes of discussion is heating the sides between corners AB, BC, CD and DA. The side heating cycle was repeated 5 times. During the side heating cycles sufficient current was applied to the stripe 26 to volatilize the stripe and heat the underlying glass to a temperature between about 1800-2000° F. (982-1093° C.) at which temperature the glass is more electrically conductive. At these temperatures the marginal edges of the sheet 14 become molten, i.e., sag and can be fused.

Another embodiment for heating the marginal edges of the sheet 14 included 3 side heating cycles. Thereafter the electrode 46 was de-energized, and the electrode 44 energized to heat edges between corners ABC and CDA. The electrodes 40 and 44 were de-energized, and electrodes 42 and 46 energized to heat edges between corners BCD and DAB. The heating of edges between corners ABC and CDA, followed by BCD and DAB is a diagonal heating cycle. In practice, the diagonal heating cycle was repeated twice.

During the heating of the marginal edges of the upper sheet, an electrically radiant strip heater 50 was used to heat the marginal edges of the lower glass sheet 12 to reduce the heat loss from the heated marginal edge of the upper sheet when they are brought into contact with each other. Actual temperature measurements were not taken; however, the heating of the marginal edges of the lower sheet is sufficient when the marginal edges of the upper sheet are not solidified upon contact with the marginal edges of the lower sheet.

After the marginal edges of the upper sheet 14 were heated, the energized electrodes were de-energized and the upper sheet moved downwardly as viewed in FIG. 3 to move the sagging marginal edges of the upper sheet 14 into contact with the heated marginal edges of the lower sheet 12. As the heated marginal edges of the sheets 12 and 14 were brought together, the heater 50 remained energized. The marginal edges of the sheets fused together. The sheets were held in a fixed relationship for about 3 seconds to uniformly fuse the edges of glass sheets. The glass sheets were pulled apart by moving the plate 36 upwardly as viewed in FIG. 3 as air was moved through the airline 34 through the pore hole 20 into the airspace 18 to provide a spacing of about 0.440 inch (1.1 centimeters) between the sheets. The sheets were held in this fixed relationship for about 20 seconds as the air was in the air line and was kept under pressure. The air assists in the separation of the sheets and shaping the sidewall 16. After the 20 seconds, the flow of air was discontinued, and the unit 10 allowed to cool to a temperature of about 900° F. (482° C.). The units remain on the support until the edges were dimensionally stable. Thereafter the unit is raised, and, although not limiting to the invention, after the unit was raised, cooling air was directed toward the edges of the unit to cool same. The unit moved from the welding station 30 through an annealing lehr (not shown). After exiting the annealing lehr, the unit was allowed to cool to room temperature. Argon gas was moved through the pore hole 20 into the airspace 18 of the unit 10 after which the pore hole was sealed. As can be appreciated, the invention is not limited to the type of insulating gas, technique for moving the gas into the airspace, or technique for sealing the pore hole. For example, the techniques taught in U.S. Pat. No. 3,683,974 which teachings are hereby incorporated by reference may be used in the practice of the invention.

With reference to FIG. 5, the strip heater 50 includes an elongated refractory piece 51, having a cut out groove 52 for receiving a resistance stripe heater 53. The strip heater 50 includes 4 refractory pieces (two only shown in FIG. 3 positioned adjacent marginal edges of the sheet 12). The stripe heater 50 is spaced about 15 ½ inches (3.81 centimeters) from the edge of the sheet 12.

Heating the marginal edges of the lower sheet provides a more uniform sidewall. If the temperature of the edges of the lower sheet is too low, the marginal edges of the upper sheet chill when brought into contact with the cooler edges of the lower sheet and an unacceptable edge seal results. If the lower edges are too hot there is no stability and both the upper and lower edges sag below the platen 32 and a sidewall having a non-uniform thickness results. Although not limiting to the invention, the marginal edges of the lower sheet are heated to a temperature of about at least 1200° F. (648° C.).

As can now be appreciated, the invention is not limited to the type of heater for heating the marginal edges of the glass sheet during the heating cycles and/or fusing of the edges. With reference to FIG. 6, units were made by moving gas through conduit 56 of heater 57, and a fluid to support combustion through conduit 58 of manifold 60 positioned adjacent the marginal edge of the lower sheet 12. The manifold 60 would be positioned adjacent to and spaced from each side of the lower glass sheet as shown in FIG. 3 for strip heater 50. The heater 57 was used in the same manner as the heater 50 was used to heat the edges sheet. The heater 57 was also used to cool edges of the unit after the sheets were pulled apart, and the edges formed. More particularly, the gas was shut off and nitrogen moved through the lines toward the edges of the unit to cool same.

With reference to FIG. 3, the invention is not limited to the technique for mounting the electrodes 40, 42, 44 and 46 relative to the corners A, B, C and D of the glass sheet 14. The technique used as shown in FIG. 3 was to mount the electrodes to the upper platen 36 by an arm member 70. A flexible electrical conduit or busbar 72 was connected at one end to an electrode and the other end has a weight 74 to bias the bus bar 72 against a plate 76 connected to a power source (not shown). Another technique used was to electrically connect the electrodes to overhead source of electrical power (not shown).

With reference to FIG. 2 the unit 10 made as discussed above has the sidewall walls sloping inward toward the airspace 18 and the coating 22. However, a reverse condition can be obtained by heating the marginal edges of the lower sheet 12 further inboard from the peripheral edge while the marginal edges of the upper sheet are heated further outboard of the peripheral edges of the upper sheet. By selectively heating the marginal edges of the sheets relative to the peripheral edges any sidewall slope can be obtained.

Another embodiment of the invention to make a glass edge units from an uncoated sheet and a coated sheet was to bring the sheets together and heat the edges of the upper sheet 12 and lower sheet using gas heaters. When the marginal edges of the sheets begin to sag, the sheets were pulled apart and the gas heat shut off. In this embodiment no electric power was used, therefore, no stripe 26 was needed and the sheet having the coating could have been the upper or lower sheet. As can be appreciated, this embodiment can be used when both glass sheets have electrically conductive coatings, non-conductive coatings, or both sheets uncoated or any combination of the foregoing.

The invention may be practiced to make glass edge insulating units having a 0.440 inch (1.1 centimeters) or more airspace using two uncoated glass sheets or glass sheets having non-conductive coatings. The invention is practiced as previously discussed; however, since neither sheet has an electrically conductive coating, the distance between the lower and upper sheets during electrical heating of the upper sheet can be at a minimum. The invention can also be practiced with a coating on outer surface of a sheet, i.e. outer surface of the unit.

As can now be appreciated, the invention is not limited to the process or equipment used to practice the process, and other adaptations may be made within the scope of the invention.

What is claimed is:

1. A method of making a multiple glazed unit having two sheets with one of the sheets having an electroconductive coating, comprising the steps of:
   providing two sheets, the first sheet having a non-conductive major surface with a conductive stripe along the marginal edges thereof and the second sheet having an electroconductive coating:
   positioning the first and second sheets in facing spaced relationship to one another a sufficient distance to prevent arcing during the practice of the following moving step;
   moving electric current along the conductive stripe of the first sheet to heat the marginal edges to a temperature sufficient to sag material edges of the first sheet;
   discontinuing the practice of said moving step:
   displacing the sheets relative to one another to move marginal edges of the first and second sheets into contact with one another; and
   pulling the sheets apart to provide an airspace therebetween.

2. The method according to claim 1, wherein the sheets are positioned in a horizontal arrangement, the first sheet is the upper sheet and the upper sheet is moved downward toward the second sheet during said displacing step.

3. The method as set forth in claim 2, wherein said step of moving includes the step of heating discreet marginal edge portions of the upper sheet.

4. The method as set forth in claim 3, wherein the stripe is a continuous electric conductive volatilizable stripe on the marginal edges of the upper sheet and said step of moving includes moving a current through the stripe to volatilize the stripe while heating the underlying glass to a temperature sufficient to move an electric current through the glass and heating the marginal edges of the lower sheet by conduction.

5. The method as set forth in claim 4, wherein the upper sheet has four corners designated A, B, C and D, and said steps of moving includes at least the step of sequentially moving a current along marginal edges between corners AB, BC, CD, and DA for a period of time and for selected number of cycles.

6. The method as set forth in claim 4, wherein the upper sheet has four corners designated A, B, C, and D and said step of moving includes at least the step of moving a current along marginal edges between by corners ABC and CDA followed by heating corners BCD and DAB for a predetermined period of time and for a selected number of cycles.

7. The method as set forth in claim 2, wherein the upper sheet is uncoated.

8. The method as set forth in claim 2, wherein the upper sheet has a non-conductive coating.

9. The method as set forth in claim 1, wherein the coating of the lower sheet is capable of withstanding elevated temperatures.

10. The method as set forth in claim 2, wherein the joined edges of the sheets are heated during the practice of said displacing step.

11. The method as set forth in claim 10, wherein the joined edges of the sheets are heated by conduction, radiation or convection.

12. The method as set forth in claim 2, further including the step of moving air into the airspace between the sheets after the sheets are joined by fusion.

13. The method as set forth in claim 2, wherein the marginal edges of the lower sheet are heated to a temperature sufficient to prevent chilling of the marginal edges of the upper sheet when the edges are brought into contact with one another.

14. The method as set forth in claim 1 wherein the second sheet has the electroconductive coating on both surfaces.

15. The method as set forth in claim 1 wherein the second sheet has the electroconductive coating on one surface and a non electroconductive coating on the other surface.

16. The method as set forth in claim 1 wherein said discontinuing step is provided after the start of the practice of said displacing step but before the sheets are close enough to have arcing between the sheets.

* * * * *

UNITED STATES PATENT AND TRADEMARK OFFICE
CERTIFICATE OF CORRECTION

PATENT NO. : 5,021,074

DATED : June 4, 1991

INVENTOR(S) : Paul J. Kovacik et al.

It is certified that error appears in the above-identified patent and that said Letters Patent is hereby corrected as shown below:

Claim 5, column 8, line 40, "steps" should read "step".

Signed and Sealed this

Twentieth Day of October, 1992

*Attest:*

DOUGLAS B. COMER

*Attesting Officer*      *Acting Commissioner of Patents and Trademarks*